(12) United States Patent
Smirnov et al.

(10) Patent No.: US 8,151,288 B2
(45) Date of Patent: Apr. 3, 2012

(54) DISK CHUCKING DEVICE

(75) Inventors: Viatcheslav Smirnov, Suwon-si (KR);
Dong-Yeon Shin, Suwon-si (KR);
Nam-Seok Kim, Osan-si (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 502 days.

(21) Appl. No.: 12/349,675

(22) Filed: Jan. 7, 2009

(65) Prior Publication Data
US 2010/0058372 A1    Mar. 4, 2010

(30) Foreign Application Priority Data

Sep. 4, 2008 (KR) .................. 10-2008-0087223

(51) Int. Cl.
*G11B 17/028* (2006.01)
(52) U.S. Cl. ...................... 720/703; 720/707
(58) Field of Classification Search ............ 720/600, 720/604, 605, 606, 607, 612, 613, 703, 707, 720/708, 713
See application file for complete search history.

(56) References Cited

U.S. PATENT DOCUMENTS

| | | | | |
|---|---|---|---|---|
| 5,956,315 A * | 9/1999 | Sawai et al. | ............... | 720/708 |
| 6,813,772 B2 * | 11/2004 | Ariyoshi | ............... | 720/600 |
| 7,100,175 B2 * | 8/2006 | Nishidate | ............... | 720/605 |
| 7,313,801 B2 * | 12/2007 | Choi et al. | ............... | 720/707 |
| 7,562,373 B2 * | 7/2009 | Iwaasa | ............... | 720/605 |
| 7,802,272 B2 * | 9/2010 | Kanzawa et al. | ............... | 720/707 |
| 7,908,614 B2 * | 3/2011 | Takaki et al. | ............... | 720/707 |

FOREIGN PATENT DOCUMENTS

| JP | 2004-171706 | 6/2004 |
|---|---|---|
| KR | 10-2006-0020933 | 3/2006 |

OTHER PUBLICATIONS

Korean Office Action, w/ English translation thereof, issued in Korean Patent Application No. KR 10-2008-0087223 dated Nov. 23, 2009.

* cited by examiner

*Primary Examiner* — Trong Phan
(74) *Attorney, Agent, or Firm* — McDermott Will & Emery LLP (57) ABSTRACT

A disk chucking device is disclosed. In accordance with an embodiment of the present invention, the disk chucking device coupling a disk to a rotor of a motor can include: a housing, which accommodates a boss that is coupled to the rotor; a plurality of chuck pins, which is inserted into the housing such that the chuck pins are protruded to the outside of the housing; an elastic body, which elastically supports an adjacent pair of the chuck pins toward the outside of the housing; a supporting surface, which is formed on an outer circumference of the boss to support a center portion of the elastic body; a guide part, which faces the supporting surface to guide a movement of the elastic body; and a protruding part, which is protruded on a lower end of the guide part toward the boss to support a lower side of the center portion of the elastic body.

8 Claims, 13 Drawing Sheets

DISK CHUCKING DEVICE

CROSS-REFERENCE TO RELATED APPLICATIONS

This application claims the benefit of Korean Patent Application No. 10-2008-0087223, filed with the Korean Intellectual Property Office on Sep. 4, 2008, the disclosure of which is incorporated herein by reference in its entirety.

BACKGROUND

1. Technical Field

The present invention relates to a disk chucking device.

2. Description of the Related Art

Generally, a disk driving device includes a disk chucking device for loading or unloading a disk and a spindle motor for rotating the disk, which is loaded by the disk chucking device, at a certain speed.

An important consideration for such disk driving device is a perfect alignment of the center of the disk chucking device and the rotational center of the disk mounted on the chucking device. If the center of the disk chucking device and the rotational center of the disk are not properly aligned, the high-speed rotation of the disk may further deviate the centers, causing vibration and noise.

Figure 1:
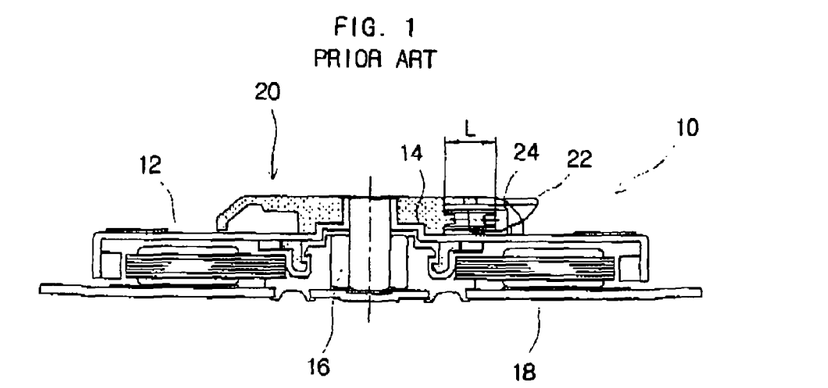
FIG. 1 is a cross sectional view illustrating a disk driving device 10 according to the related art.

FIG. 1 is a cross sectional view illustrating a disk driving device 10 according to the related art. As shown in FIG. 1, the disk driving device 10 has recently become much thinner, in response to a trend toward smaller sizes. Especially to reduce the overall thickness of a spindle motor 10, a shelf 14 is formed in the middle of a rotor case 12 so that space for holding the top portion of a bearing 16 is provided in the middle of the rotor case 12, and the portion facing a stator 18 is lowered.

Figure 2:
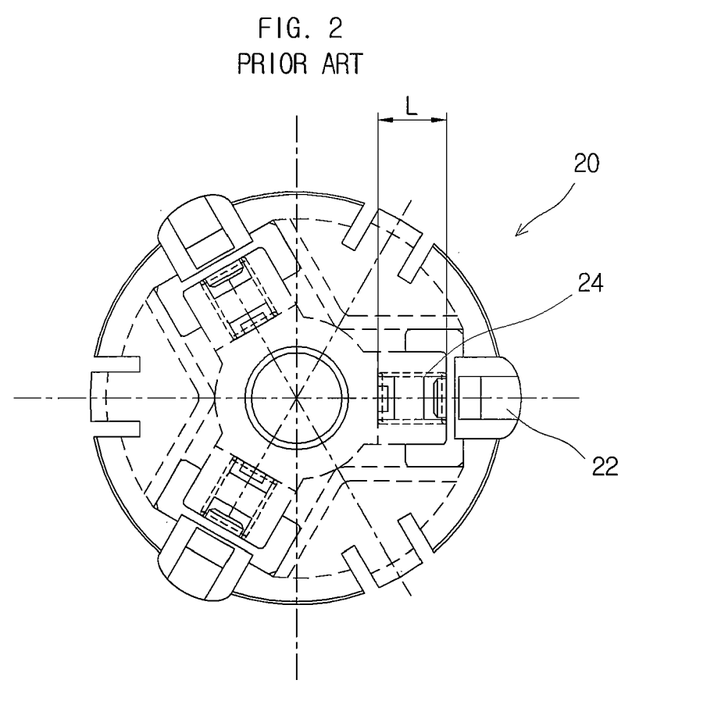
FIG. 2 is a bottom view illustrating a disk chunking device according to the related art.

FIG. 2 is a bottom view illustrating a disk chunking device 20 according to the related art. As shown in FIG. 2, a coil spring 24, which supports a chuck pin 22 elastically, is disposed in the radial direction of the conventional disk chunking device 20.

Accordingly, the disk chucking device 20 being coupled on top of the rotor case 12 may not have enough length, which will hereinafter be cited within the description as 'L', to accommodate the coil spring 24 because of the shelf 14 inside the disk chucking device 20. If the length of the coil spring 24 is not enough, the coil spring 24 may not have constant force against the same displacement.

Therefore, the chuck pin 22 may not be able to support the inner circumference of the disk with a constant force, misaligning the center of the disk chucking device 20 and the rotational center of the disk. If these centers are not properly aligned, a pick-up unit may not be able to write and/or read information accurately.

SUMMARY

An aspect of the present invention provides a disk chucking device in which the center of rotation is better aligned.

Another aspect of the present invention provides a disk chucking device. The disk chucking device 100, which couples a disk 33 to a rotor 320 of a motor, can include: a housing 102, which accommodates a boss 130 that is coupled with the rotor 320; a plurality of chuck pins 110, which is inserted into the housing 102 such that the chuck pins 110 are protruded to the outside of the housing 102; an elastic body, which elastically supports an adjacent pair of the chuck pins 110 toward the outside of the housing 102; a supporting surface 132, which is formed on an outer circumference of the boss 130 to support a center portion of the elastic body; a guide part 140, which faces the supporting surface 132 to guide a movement of the elastic body; and a protruding part 150, which is protruded on a lower end of the guide part 140 toward the boss 130 to support a lower side of the center portion of the elastic body.

Here, the boss can be thinner than the guide part, and the guide part can be curved such that the guide part provides elastic force toward a direction in which the chuck pin is protruded.

In addition, a supporting part can be formed on opposite side of the chuck pin of the housing, in which the supporting part elastically supports the inner circumference of the disk. Here, the outer circumference of the supporting part can include: a first inclined part, which is in direct contact with a top surface of the supporting part; a second inclined part, which is in direct contact with the first inclined part; and a vertical part, which is in direct contact with the second inclined part. Each convex surface can be disposed between the top surface of the supporting part and the first inclined part, between the first inclined part and the second inclined part, and between the second inclined part and the vertical part, respectively.

Furthermore, an angle between the first inclined part and the vertical part can be formed wider than an angle between the second inclined part and the vertical part. Here, the first inclined part and the second inclined part can be convex surfaces.

Additional aspects and advantages of the present invention will be set forth in part in the description which follows, and in part will be obvious from the description, or may be learned by practice of the invention.

DETAILED DESCRIPTION

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

While such terms as "first" and "second," etc., may be used to describe various components, such components must not be limited to the above terms. The above terms are used only to distinguish one component from another. For example, a first component may be referred to as a second component, without departing from the scope of rights of the present invention, and likewise a second component may be referred to as a first component. The term "and/or" encompasses both combinations of the plurality of related items disclosed and any item from among the plurality of related items disclosed.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, shelves, actions, components, parts, or combinations thereof disclosed in the specification, and are not intended to preclude the possibility that one or more other features, numbers, shelves, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

A disk chucking device according to certain embodiments of the invention will be described below in more detail with reference to the accompanying drawings. Those components that are the same or are in correspondence are rendered the same reference numeral regardless of the figure number, and redundant explanations are omitted.

The embodiments are described below in order to explain the present general inventive concept by referring to the figures.

Figure 3:
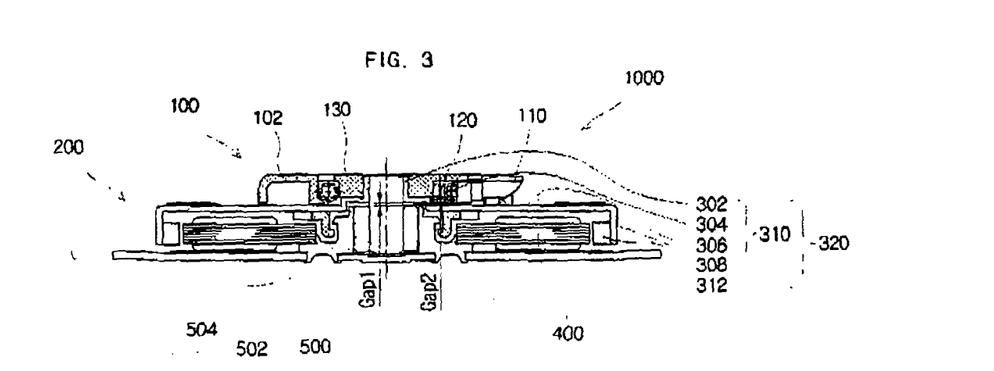
FIG. 3 is a cross sectional view illustrating a disk chucking device and a spindle motor according to an embodiment of the present invention.

FIG. 3 is a cross sectional view illustrating a disk chucking device and a spindle motor according to an embodiment of the present invention. A disk driving device 1000 can include a disk chucking device 100 and a spindle motor 200. In accordance with an embodiment of the present invention, as illustrated in FIG. 3, the disk chucking device 100 coupling a disk 33 to a rotor 320 of the motor can include: a housing 102, which accommodates a boss 130 that is coupled with the rotor 320; a plurality of chuck pins 110, which is inserted into the housing 102 such that the chuck pins 110 are protruded to the outside of the housing 102; an elastic body 120, which elastically supports an adjacent pair of the chuck pins 110 toward the outside of the housing 102; a supporting surface 132, which is formed on an outer circumference of the boss 130 to support a center portion of the elastic body; a guide part 140, which faces the supporting surface 132 to guide a movement of the elastic body; and a protruding part 150, which is protruded on a lower end of the guide part 140 toward the boss 130 to support a lower side of the center portion of the elastic body. As a result, the disk chucking device 100 according to this embodiment can improve the way the elastic body, which supports the chuck pin 110, is disposed and improve a perfect alignment of the center of the disk chucking device 100 and the rotational center of the disk 33.

The disk 33 is a circular disk used to store data and can be mounted on the spindle motor 200 as the housing 102 of the disk chucking device 100 is inserted in the inner circumference of the disk 33. The disk chucking device 100 can couple the disk 33 to the spindle motor 200, which is a driving device, such that the disk 33 can be mounted and demounted.

The spindle motor 200 can include: the rotor 320; a shaft 500, which is coupled with the rotor 320; a bearing 502, which supports the shaft 500 such that the shaft can be rotated; a holder 504, which supports the bearing 502; a stator 400, which is coupled to the holder 504 and faces a driving magnet 312 of the rotor 320; and a base plate, which supports the holder 504.

Here, the rotor 320 can include a rotor case 310, which is a body of the rotor, and the driving magnet 312, which is coupled to the rotor. The rotor case 310 can include: a burring portion 302, which is protruded upward to couple with the shaft 500; an expansion part 306, which is extended outward to cover the stator 400; and a cylinder part 308, which is extended downward such that the driving magnet 312 can face the stator 400.

In particular, a shelf 304 can be formed in the middle of the expansion part 306 such that the top portion of the bearing 502 can be held. By forming the shelf 304, the portion facing the stator 400 can be more close to the stator 400 so that the overall height of the spindle motor 200 can be lowered.

Figure 4:
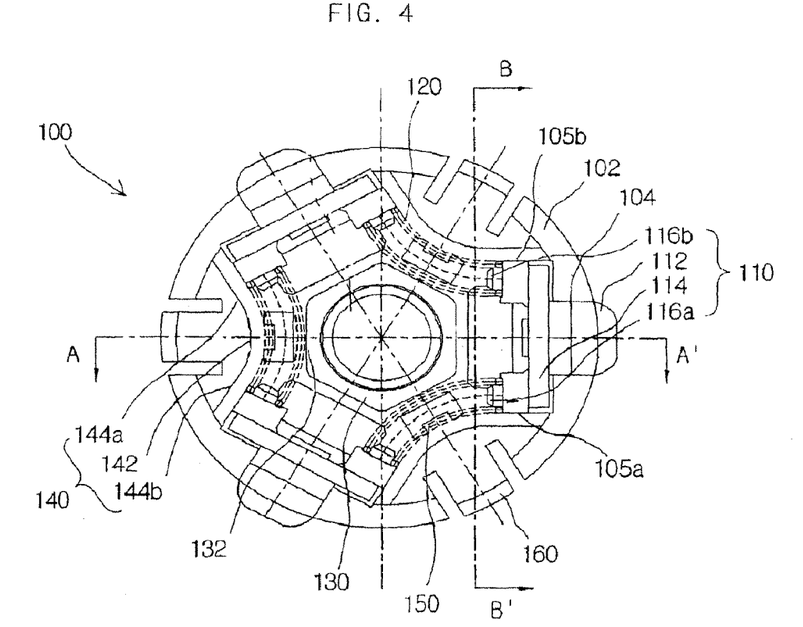
FIG. 4 is a bottom view illustrating a disk chucking device according to an embodiment of the present invention.
Figure 5:
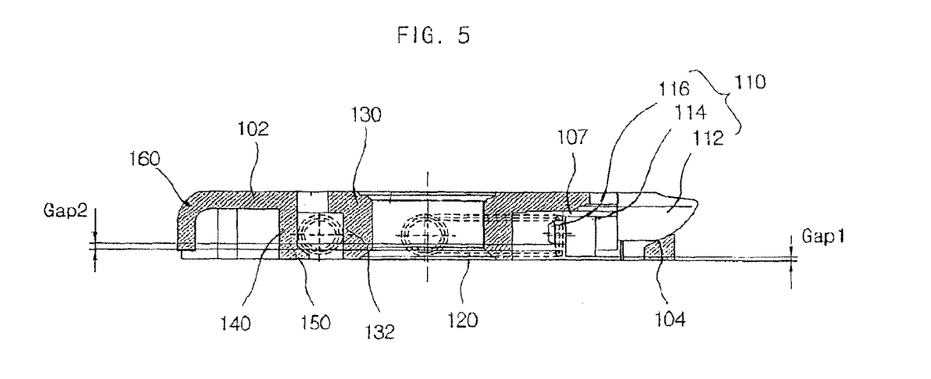
FIG. 5 is a cross sectional view illustrating a section of the disk chucking device based on a transversal line A-A' in FIG. 4.
Figure 6:
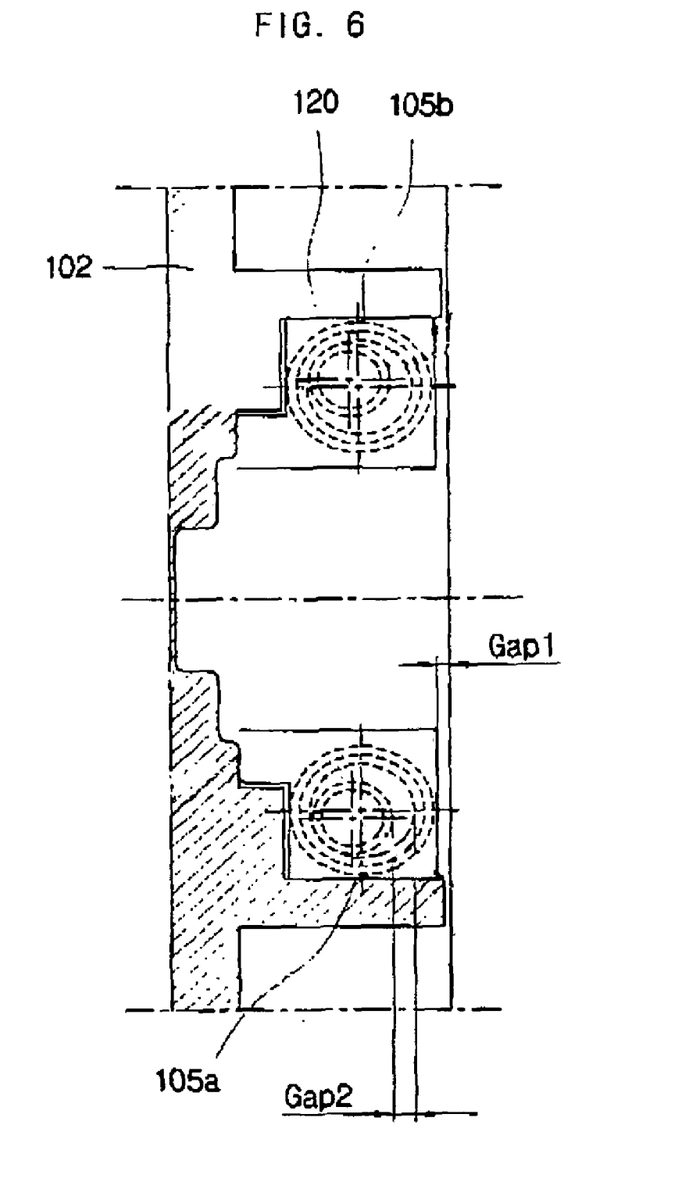
FIG. 6 is a cross sectional view illustrating a section of the disk chucking device based on a transversal line B-B' in FIG. 4.

FIG. 4 is a bottom view illustrating a disk chucking device 100 according to an embodiment of the present invention, FIG. 5 is a cross sectional view illustrating a section of the disk chucking device 100 based on a transversal line A-A' in FIG. 4, and FIG. 6 is a cross sectional view illustrating a section of the disk chucking device 100 based on a transversal line B-B' in FIG. 4. As illustrated in FIG. 4, in general, the housing 102 has a circular shape, and the boss 130, which is coupled with the burring part 302 of the rotor case 310, can be formed in the middle of the disk chucking device.

As shown in FIG. 5, the vertical thickness of the boss 130 can be thinner than the thickness of the guide part 140, which will be described later in the description. As described above, to make the spindle motor 200 very flat, a shelf 304 can be formed on the rotor case 310 so that the expansion part 306 can be varied in height.

In response to the above, the thickness of the boss 130 of the disk chucking device 100 and the thickness of the guide part 140 can be formed differently, so that the disk chucking device 100 can be coupled closely to the shelf 304 of the rotor case 310.

An insertion hole 104 can be formed at an outer circumference of the housing 102, and the chuck pin 110 can be inserted into the insertion hole. Overall, there are three insertion holes 104 being formed at an interval of 120° along an outer circumference of the housing 102.

The chuck pin 110 can be inserted into the insertion hole such that the chuck pin is protruded to the outside of the housing 102. Formed on one side of the chuck pin 110 is a projection part 112, which can be protruded to the outside of the housing 102, to catch an inner circumference of the disk 33.

The width of an extended part 114 can be formed wider than the width of the projection part 112, allowing the chuck pin 110 to be caught in the housing 102 to keep the chuck pin 110 from being separated from the housing 102. As illustrated in FIG. 5 or 6, an upper surface of the extended part 114 can be in contact with a lower surface 107 of the housing 102.

A holding part 116, which is inserted into the coil spring 120, can be formed on another side of the chuck pin 110. The holding part 116 can be shaped like a cylinder, which is protruded from the chuck pin 110, and its diameter can be smaller than the diameter of the coil spring 120. An upper portion of the holding part 116 can be in contact with an upper surface of an inner circumference of the coil spring 120, and there may be a certain gap, which will hereafter be cited as 'gap2', created by a lower portion of the holding part 116 and a lower surface of an inner circumference of the coil spring 120.

There can be a certain gap, which will hereinafter be cited as 'gap1', created by a lower surface of the extended part 114 and an upper surface of the rotor case 310. Furthermore, an upper surface of the extended part 114 can be in contact with a lower surface 107 of the housing 102, and there can be also a certain gap created by a lower surface of the extended part 114 and an upper surface of the rotor case 310.

Accordingly, if the projection part 112 is pressed downward under the disk while the disk 33 is mounted, the projection part 112 can be rotated about the upper surface, which is in direct contact with the lower surface 107 of the housing 102, of the extended part 114 and then be inserted into the housing 102.

A holding part 116, which is pressed by the coil spring 120 and coupled to the coil spring 120, can be formed. Overall, there can be two coil springs 120 supporting one chuck pin 110 so that two holding parts 116a and 116b can be formed for each chuck pin 110.

An elastic body can elastically support an adjacent pair of the chuck pins 110 toward the outside of the housing 102. The elastic body, for example, can be a coil spring 120. In other words, a single chuck pin 110 can be pressed by a pair of the coil springs 120, which are adjacent to each other, at the same time.

As a result, since the two coil springs 120 are linked with each other through the single chuck pin 110, the deviation of the modulus of elasticity of the coil spring 120 can be dispersed so that the coil springs can be self-adjustable.

In addition, the coil spring 120 can be interposed between a pair of the chuck pins 110 as it is curved, and thus a longer coil spring 120 can be used in comparison with a conventional coil spring disposed in a radial direction. Because of the dynamic property of coil springs, the longer the coil spring 120 is, the better it can provide constant elastic force against the same displacement. As a result, the coil spring 120 can press the chuck pin 110 under more constant force.

Consequently, while the longer coil spring 120 is used, two coil springs 120 can elastically support one chuck pin 110 so that an inner circumference of the disk 33 can be pressed under the same force, and thus the alignment of the center of the disk chucking device 100 and the rotational center of the disk 33 can be improved more precisely. A supporting surface 132 can be formed on an outer circumference of the boss 130 such that the supporting surface can support a center portion of the elastic body. The coil spring 120 can be interposed between a pair of the chuck pins 110 as it is curved toward the center of the housing 102, and the center portion of the coil spring 120 can be disposed toward the boss 130. The coil spring 120 can minimize its deviation of the modulus of elasticity if shrunk or relaxed as the coil spring is curved gently. Therefore, the supporting surface 132 formed flat on an outer circumference of the boss 130 can support the center portion of the coil spring 120, prevent the coil spring 120 being bent excessively, and minimize its deviation of the modulus of elasticity.

A guide part 140 can be formed against the supporting surface 132 to guide a movement of the coil spring 120. By forming the guide part 140 facing a supporting part 160, a space for holding the coil spring 120 can be formed.

Formed on both ends of the guide part 140 are two straight parts 144a and 144b, which are extended in the radial direction of the housing 102 such that the chuck pin 110 can be moved in the radial direction of the housing 102, and formed in the middle of the guide part 140 is a curved part 142, which is curved toward the boss 130 to gently connect the two straight parts. That is, the guide part 140 can include the straight parts 144a and 144b, which are adjacent to the two chuck pins 110 on both ends of the guide part and extended in the radial direction of the housing 102, and the curved part 142, which is curved toward the boss 130 to gently connect the two straight parts, in the middle of the guide part 140. The straight part 144 of the guide part 140 can support the coil spring 120 such that an end of the coil spring moves in the radial direction of the housing (105a and 105b in FIG. 6) and be straight in a direction in which the chuck pin 110 is moved.

Then, the curved part 142 facing the supporting surface 132 can restrict an unwanted movement of a center portion 122 of the coil spring 120 and support the coil spring such that the coil spring 120 can be curved slowly. As a result, the guide part 140 can be curved, in which the coil spring 120 is disposed, such that the guide part provides elastic force toward a direction in which the chuck pin 110 is protruded.

A protruding part 150 can be protruded on a lower end of the guide part 140 toward the boss 130 to support a lower side of the center portion of the elastic body. The protruding part 150 can be formed in the middle of the guide part 140, i.e., in the middle of the curved part 142 which is in contact with the rotor case 310. An upper surface of the protruding part 150 can be inclined downward to wrap an outer circumference of the coil spring 120.

A penetrated hole 103 can be formed against an upper surface of the protruding part 150 on a lower surface of the housing 102. When modeling the housing 102 by way of the reaction injection method, the penetrated hole 103, for example, can facilitate the manufacture of molds, omit an additional manufacturing process of moldings in some cases, and facilitate the manufacture of the protruding part 150.

The protruding part 150 can restrict a vertical movement of the coil spring 120 by supporting a lower surface of the center part 122 of the coil spring 120 while a lower surface of the housing 102 supports an upper surface of the coil spring 120. Consequently, the protruding part 150 can prevent an unwanted zigzag movement in a vertical direction and prevent a deviation of force when the coil spring 120 presses the chuck pin 110.

In addition, the protruding part 150 can prevent the coil spring 120 from being in contact with the rotor case 310 of the expansion part 306, and thus the coil spring 120 is not affected by the state of a surface of the rotor case 310. Therefore, the coil spring 120 can be evenly pressed or relaxed throughout.

Figure 7:
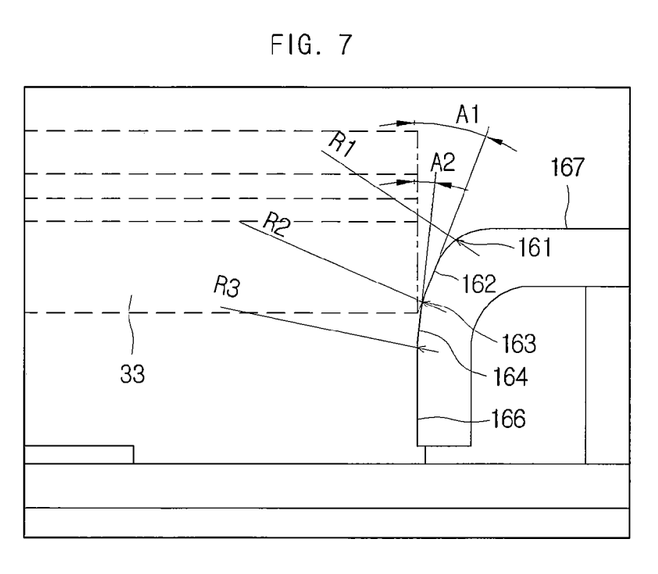
FIG. 7 is a cross sectional view illustrating a disk being placed on a supporting part of a disk chucking device according to an embodiment of the present invention.
Figure 8:
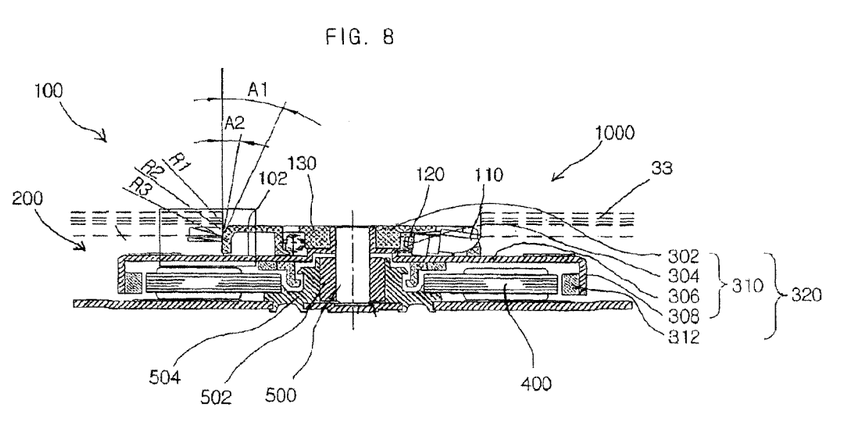
FIG. 8 is a cross sectional view illustrating a disk being placed on a disk chucking device according to an embodiment of the present invention.

FIG. 7 is a cross sectional view illustrating a disk 33 being placed on a supporting part 160 of a disk chucking device 100 according to an embodiment of the present invention. FIG. 8 is a cross sectional view illustrating the disk 55 being placed on the disk chucking device 100 according to an embodiment of the present invention.

As illustrated in FIGS. 7 and 8, a supporting part 160 can be formed on an opposite side of the chuck pin 110 of the housing 102 to elastically support an inner circumference of the disk 33. The supporting part 160 and the chuck pin 110 can couple the disk 55 to the disk chucking device 100 by pressing against an inner circumference of the disk 33 such that the disk can be mounted and demounted.

The housing 102 can be made of a material having an elastic property such as plastic resin, and the supporting part 160 can be a part of the housing 102. Each of the supporting parts 160, which are separated by 120 degrees from one another, is separated by 60 degrees from one of the chuck pins 110.

An outer circumference of the supporting part 160 can include: a first inclined part 162, which is in contact with an upper surface 167 of the supporting part 160; a second inclined part 164, which is in contact with the first inclined part 162; and a vertical part 166, which is in contact with the second inclined part 164. The supporting part 160 can be a part of the housing 102, and an upper surface of the housing 102 can be horizontally leveled.

Accordingly, the upper surface 167 of the supporting part 160 can be extended from the upper surface of the housing 102 to make a horizontal surface. In addition, the surface of the vertical part 166 can be vertically straight, and the surfaces of the first inclined part 162 and the second inclined part 164 can be lineally inclined.

The first inclined part 162 can guide the inner circumference of the disk 33 to enter the housing 102, when the disk 33 is mounted on the disk chucking device 100 an angle, A1, created by the first inclined part 162 and the vertical part 166 can be greater than an angle, A2; created by the second inclined part 164 and the vertical part 166.

Accordingly, since an angle created by the second inclined part 164 and the vertical part 166 is narrower than an angle created by the first inclined part 162 and the vertical part 166, the user can mount the disk 33 on the disk chucking device 100 with less force than normally necessary when the inner circumference of the disk 33 enters the second inclined part 164. As a result, the user can easily mount and/or demount the disk 33 on and/or from the disk chucking device 100.

A convex surface 161, which has a radius of R1, a convex surface 163, which has a radius of R2, and a convex surface 165, which has a radius of R3, can be disposed between the upper surface 167 of the supporting part 160 and the first inclined part 162, between the first inclined part 162 and the second inclined part 164, and between the second inclined part 164 and the vertical part 166, respectively. By forming a gentle gradient to connect each inclined surface, the inner circumference of the disk 33 can be gently mounted along the outer circumference of the supporting part 160.

Here, R1, R2, and R3 can be changed such that the convex surfaces 161, 163, and 165 can be gently connected with the upper surface 167 of the supporting part 160, the first inclined part 162, the second inclined part 164, and the vertical part 166, respectively.

When the disk 33 is mounted on the disk chucking device 100, the chuck pin 110 can be rotated about the upper surface, which is in direct contact with the bottom side of the housing 102, as the chuck pin 110 is inserted into the housing 102.

Figure 9:
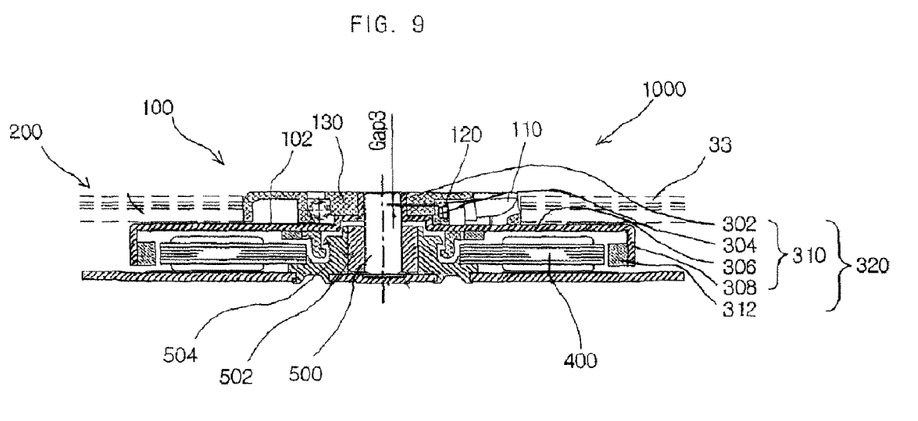
FIG. 9 is a cross sectional view illustrating a disk placed on a disk chucking device according to an embodiment of the present invention.
Figure 10:
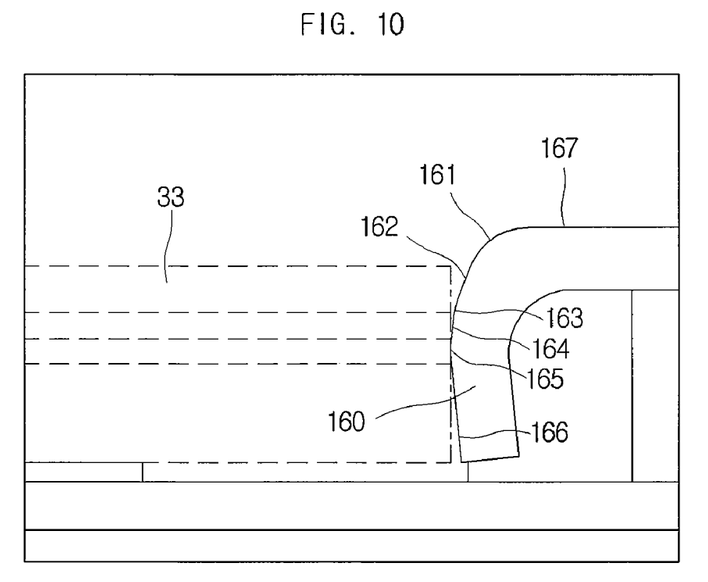
FIG. 10 is a cross sectional view illustrating a disk placed on a supporting part of a disk chucking device according to an embodiment of the present invention.

FIG. 9 is a cross sectional view illustrating a disk 33 placed on a disk chucking device 100 according to an embodiment of the present invention. FIG. 10 is a cross sectional view illustrating the disk 33 placed on a supporting part 160 of the disk chucking device 100 according to an embodiment of the present invention.

As illustrated in FIG. 9, when the disk 33 is mounted on the disk chucking device 100, the bottom side of the chucking device 110 can be in contact with the expansion part 306 of the rotor case 310, and there can be a gap, 'gap 3', created by an upper surface of the chucking fin 110 and an upper surface of the housing 102.

Since the coil spring 120 elastically supports the chuck pin 110 toward the outside of the housing 102, the chuck pin 110 can couple the disk 33 to the spindle motor 200 by pressing the inner circumference of the disk 33 toward the rotor case 310.

As illustrated in FIG. 10, when the disk 33 is mounted on the disk chucking device 100, the supporting part 160 can elastically support the inner circumference of the disk 33 toward the outside of the housing 102 and couple the disk 33 to the spindle motor 200.

Here, the inner circumference of the disk 33 and the supporting part 160 can be in contact with a convex surface 165, which connects the vertical part 166 and the second inclined part 164. As a result, with the inner circumference of the disk 33 is in contact with the perimetric line of the supporting part 160, allowing the supporting part 160 to evenly support the inner circumference of the disk 33.

Therefore, the disk chucking device 100 according to the present embodiment can improve the alignment of the center of the disk chucking device 100 and the rotational center of the disk 33, such that the chuck pin 110 and the supporting part 160 can support the inner circumference of the disk 33 with even force, by improving the configuration of the coil spring 120 and improving the shape of an outer circumference of the supporting part 160.

Furthermore, the user can mount the disk 33 on the disk chucking device 100 with less force than normally necessary by forming the angle A2 created by the second inclined part 164 and the vertical part 166 narrower than the angle A1 created by the first inclined part 162 and the vertical part 166.

Figure 11:
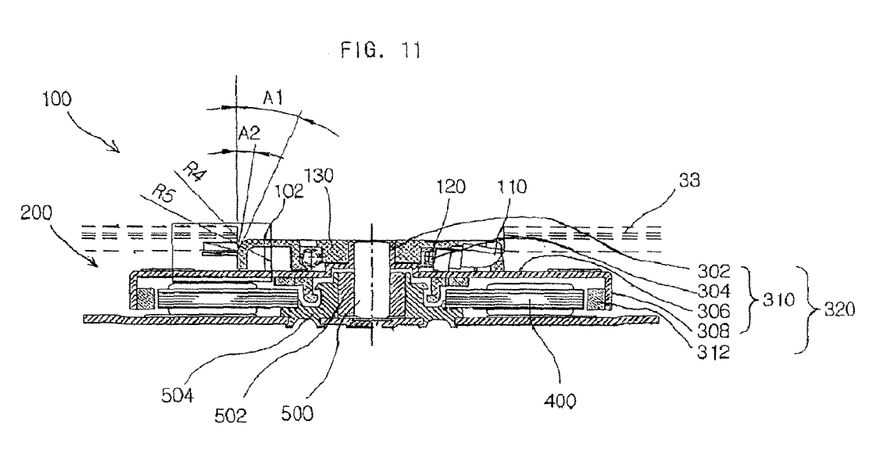
FIG. 11 is a cross sectional view illustrating a disk being placed on a disk chucking device according to another embodiment of the present invention.

FIG. 11 is a cross sectional view illustrating a disk 33 being placed on a disk chucking device 220 according to another embodiment of the present invention. The disk chucking device 220 according to the present embodiment can present another example of the supporting part 160, which has been described above in accordance with an embodiment of the present invention. Components, other than a disk chucking device 220 and a supporting part 260 of a spindle motor 200 according to this embodiment, can be substantially the same as those of the disk chucking device 100 and the spindle motor 200 based on an embodiment of the present invention described above.

Figure 12:
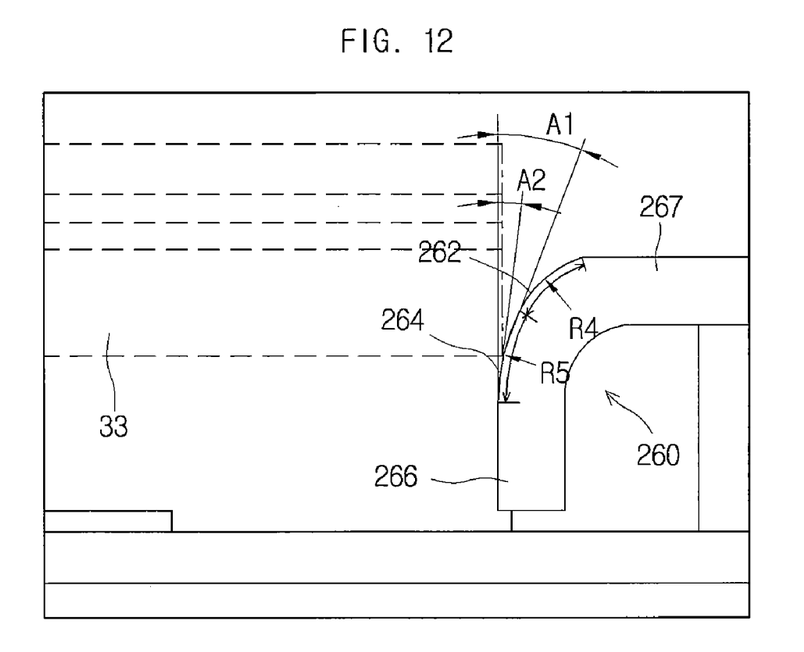
FIG. 12 is a cross sectional view illustrating a disk being placed on a supporting part of a disk chucking device according to another embodiment of the present invention.

FIG. 12 is a cross sectional view illustrating a disk 33 being placed on a supporting part 260 of the disk chucking device 220 according to another embodiment of the present invention. As illustrated in FIG. 12, the supporting part 260 of the present embodiment can include a first inclined part 262, which is a convexly curved surface having a radius of R4, and a second inclined part 264, which is a convexly curved surface having a radius of R5.

An upper surface 267 of the supporting part 260 can be horizontally leveled. The first inclined part 262 can be a convexly curved surface having a radius of R4 and be connected with an upper surface of the supporting part 260.

Furthermore, the second inclined part 264 can be a convexly curved surface having a radius of R5 and be connected with the first inclined part 262. Here, a convexly curved surface created by the first inclined part 262 and the second inclined part 264 can be omitted. An angle A2 created by a vertical part 266 and the second inclined part 264 can be an angle created by a tangent line of the second inclined part 264 and the vertical part 266 sharing a common endpoint at which the second inclined part 264 and the vertical part 266 meet. Furthermore, an angle A1 created by the vertical part 266 and a second inclined part 262 can be an angle created by a tangent line of the first inclined part 262 and the vertical part 266 sharing a common endpoint at which the first inclined part 262 and the second inclined part 264 meet.

The two angles A1 and A2 can also have the relationship of A2>A1 in accordance with an embodiment of the present invention. As such, when mounting the disk 33 on the disk chucking device 220, an inner circumference of the disk 33 can enter the disk chucking device 220 along the second inclined part 264. As a result, the user can easily mount or demount the disk 33 on the disk chucking device 220 with less force than normally necessary.

Figure 13:
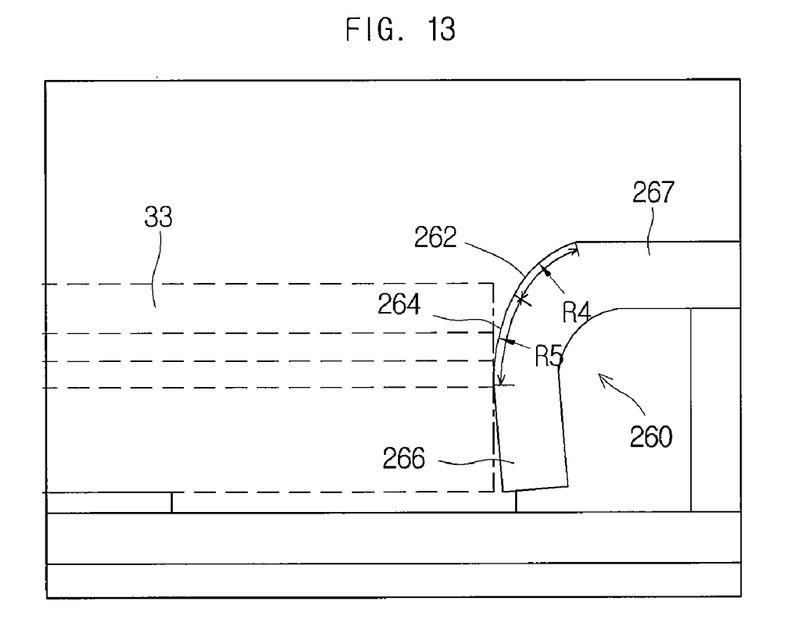
FIG. 13 is a cross sectional view illustrating a disk placed on a supporting part of a disk chucking device according to another embodiment of the present invention.

FIG. 13 is a cross sectional view illustrating the disk 33 being placed on the supporting part 260 of the disk chucking device 220 according to another embodiment of the present invention. As illustrated in FIG. 13, when the disk 33 is mounted on the disk chucking device 220, an inner circumference of the disk 33 can be in contact with a portion at which the second inclined part 264 and the vertical part 266 of the supporting part 260 meet.

Therefore, with an inner circumference of the disk 33 is in contact with the perimetric line of the supporting part 260, allowing the supporting part 260 to evenly support an inner circumference of the disk 33.

Therefore, the disk chucking device 220 according to the present embodiment allows the chuck pin 110 and the supporting part 260 to evenly support an inner circumference of the disk 33, improving the alignment of the center of the disk chucking device 220 and the rotational center of the disk 33.

While the spirit of the invention has been described in detail with reference to particular embodiments, the embodiments are for illustrative purposes only and do not limit the invention. It is to be appreciated that those skilled in the art can change or modify the embodiments without departing

What is claimed is:

1. A disk chucking device coupling a disk to a rotor of a motor such that the disk can be mounted and demounted, the disk chucking device comprising:
   a housing accommodating a boss being coupled with the rotor;
   a plurality of chuck pins inserted into the housing such that the chuck pins are protruded to the outside of the housing;
   an elastic body disposed in between a pair of adjacent chuck pins to elastically support the adjacent pair of the chuck pins toward the outside of the housing;
   a supporting surface formed on an outer circumference of the boss to support a center portion of the elastic body;
   a guide part facing the supporting surface to guide a movement of the elastic body; and
   a protruding part protruded on a lower end of the guide part toward the boss to support a lower side of the center portion of the elastic body.

2. The disk chucking device of claim 1, wherein the boss is thinner than the guide part.

3. The disk chucking device of claim 1, wherein the guide part is curved such that the guide part provides elastic force toward a direction in which the chuck pin is protruded.

4. The disk chucking device of claim 1, wherein a supporting part is formed on an opposite side of the chuck pin of the housing, the supporting part elastically supporting an inner circumference of the disk.

5. The disk chucking device of claim 4, wherein an outer circumference of the supporting part comprises:
   a first inclined part being in direct contact with an upper surface of the supporting part;
   a second inclined part being in direct contact with the first inclined part; and
   a vertical part being in direct contact with the second inclined part.

6. The disk chucking device of claim 5, wherein a convex surface is disposed between the upper surface of the supporting part and the first inclined part, between the first inclined part and the second inclined part, and between the second inclined part and the vertical part, respectively.

7. The disk chucking device of claim 5, wherein an angle created by the first inclined part and the vertical part is greater than an angle created by the second inclined part and the vertical part.

8. The disk chucking device of claim 7, wherein the first inclined part and the second inclined part are convexly curved surfaces.

* * * * *